US012595610B2

(12) United States Patent
Dillon et al.

(10) Patent No.: US 12,595,610 B2
(45) Date of Patent: Apr. 7, 2026

(54) SYSTEM FOR DETECTING THE POSITION OF A WASHING MACHINE SUBWASHER

(71) Applicant: Haier US Appliance Solutions, Inc., Wilmington, DE (US)

(72) Inventors: Nicholas Dillon, Louisville, KY (US); Darrin Smith, Baltimore, MD (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 224 days.

(21) Appl. No.: 18/352,320

(22) Filed: Jul. 14, 2023

(65) Prior Publication Data

US 2025/0019884 A1 Jan. 16, 2025

(51) Int. Cl.
| | |
|---|---|
| *D06F 34/16* | (2020.01) |
| *D06F 23/04* | (2006.01) |
| *D06F 33/48* | (2020.01) |
| *D06F 34/20* | (2020.01) |
| *D06F 34/28* | (2020.01) |
| *D06F 37/24* | (2006.01) |
| *D06F 37/30* | (2020.01) |
| *G01D 5/14* | (2006.01) |
| *D06F 103/26* | (2020.01) |
| *D06F 105/46* | (2020.01) |
| *D06F 105/58* | (2020.01) |

(52) U.S. Cl.
CPC .............. *D06F 34/16* (2020.02); *D06F 23/04* (2013.01); *D06F 33/48* (2020.02); *D06F 34/20* (2020.02); *D06F 34/28* (2020.02); *D06F 37/24* (2013.01); *D06F 37/304*

(2013.01); *G01D 5/14* (2013.01); *D06F 2103/26* (2020.02); *D06F 2105/46* (2020.02); *D06F 2105/58* (2020.02)

(58) Field of Classification Search
None
See application file for complete search history.

(56) References Cited

U.S. PATENT DOCUMENTS

| | | | | |
|---|---|---|---|---|
| 6,065,170 | A | * | 5/2000 | Jang ...................... D06F 39/087 68/12.27 |
| 8,333,520 | B1 | | 12/2012 | Cronin |
| 10,000,876 | B2 | | 6/2018 | Davis |

FOREIGN PATENT DOCUMENTS

| | | |
|---|---|---|
| CN | 115538096 A | 12/2022 |
| DE | 102011084267 A1 | 4/2013 |
| KR | 100545376 B1 | 1/2006 |

OTHER PUBLICATIONS

WO 2008018350 A1, Espacenet translation, Washing Machine, Misumi (Year: 2008).*

* cited by examiner

*Primary Examiner* — Cristi J Tate-Sims
(74) *Attorney, Agent, or Firm* — Dority & Manning, P.A.

(57) ABSTRACT

A laundry appliance includes a subwasher suspended within a cabinet by one or more suspension elements, and one or more linear position sensors fixed to the cabinet for determining the position of the subwasher within the cabinet. A controller is configured to receive input from the one or more position sensors and determine the position of the subwasher from the position sensor input.

20 Claims, 7 Drawing Sheets

SYSTEM FOR DETECTING THE POSITION OF A WASHING MACHINE SUBWASHER

FIELD OF THE INVENTION

The present disclosure relates generally to washing machine appliances. More particularly to washing machine appliances including a system that may detect the position of a subwasher within a washing machine cabinet.

BACKGROUND OF THE INVENTION

Washing machine appliances generally include a cabinet configured to receive a tub for containing wash fluid and a wash basket rotatably mounted within the wash tub. A drive assembly is coupled to the wash tub and configured to rotate the wash basket within the wash tub agitate a load of laundry articles (i.e. clothes) within the wash basket. Often, the tub, wash basket, and drive assembly, taken together as one unit, are referred to as a subwasher.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances, also known as top load washers, typically have the subwasher supported in the cabinet with suspension devices. The suspension devices generally maintain the subwasher in a level and plumb orientation when the wash basket is not rotating (i.e. a static position). When the wash basket is rotating, the suspension devices allow the subwasher to move relative to the cabinet (i.e., dynamic position). Horizontal axis washing machine appliances, also known as front load washers, may also have the subwasher suspended within the cabinet with similar suspension devices for the same, or substantially the same, purposes.

A concern during operation of washing machine appliances is the balance of the subwasher during operation. For example, laundry articles, particularly wet laundry articles, loaded within a wash basket may not be equally weighted about a central axis of the subwasher. Accordingly, when the wash basket rotates, in particular during a spin cycle, the imbalance in laundry article weight distribution may cause eccentric rotation of the subwasher within the cabinet, leading to excessive noise and vibration. In cases in which the eccentric rotation exceeds the design limit, the subwasher may contact the cabinet, potentially causing damage to the appliance.

A subwasher not properly aligned with the cabinet may accentuate the negative impact an imbalanced laundry load may have on the operation of the laundry appliance. For example, a subwasher that is not centered within the cabinet is necessarily closer to one or more cabinet panels than a centered subwasher. An eccentric rotation is therefore more likely to result in contact between the subwasher and the cabinet.

Known position sensing systems for washing machine subwashers do not detect a misaligned subwasher within the cabinet. This can be a disadvantage if the subwasher is not evenly spaced within the cabinet. Accordingly, improvements to position sensing systems for washing machine subwashers may be desirable.

BRIEF DESCRIPTION OF THE INVENTION

Aspects and advantages of the invention will be set forth in part in the following description, may be apparent from the description, or may be learned through practice of the invention.

In one exemplary aspect, a laundry appliance is provided including a subwasher suspended within a cabinet, one or more suspension elements fixed at a first end to the cabinet and at a second end to the subwasher, one or more position sensors fixed to the cabinet, and a controller in operative communication with the one or more sensors. The controller is configured to receive input from the one or more position sensors and determine a static position of the subwasher from the input.

In another exemplary aspect, a method of operating a washing machine appliance is provided. The washing machine includes a cabinet, a subwasher comprising a tub, a wash basket configured for receipt of a load of laundry articles and supported for rotation within the tub, and a motor mechanically coupled to the basket, one or more suspension elements positioning the subwasher within the cabinet, and one or more position sensors fixed to the cabinet. The method includes obtaining a first input from the one or more sensors, and determining a static position of the subwasher from the first input. The method further includes rotating the wash basket with the load of laundry articles, obtaining a second input from the one or more sensors, determining a dynamic position of the subwasher, determining a change in position based on the static position and the dynamic position and identifying an out of balance condition of the subwasher when at least one of the dynamic position and the change in position exceeds a prescribed value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
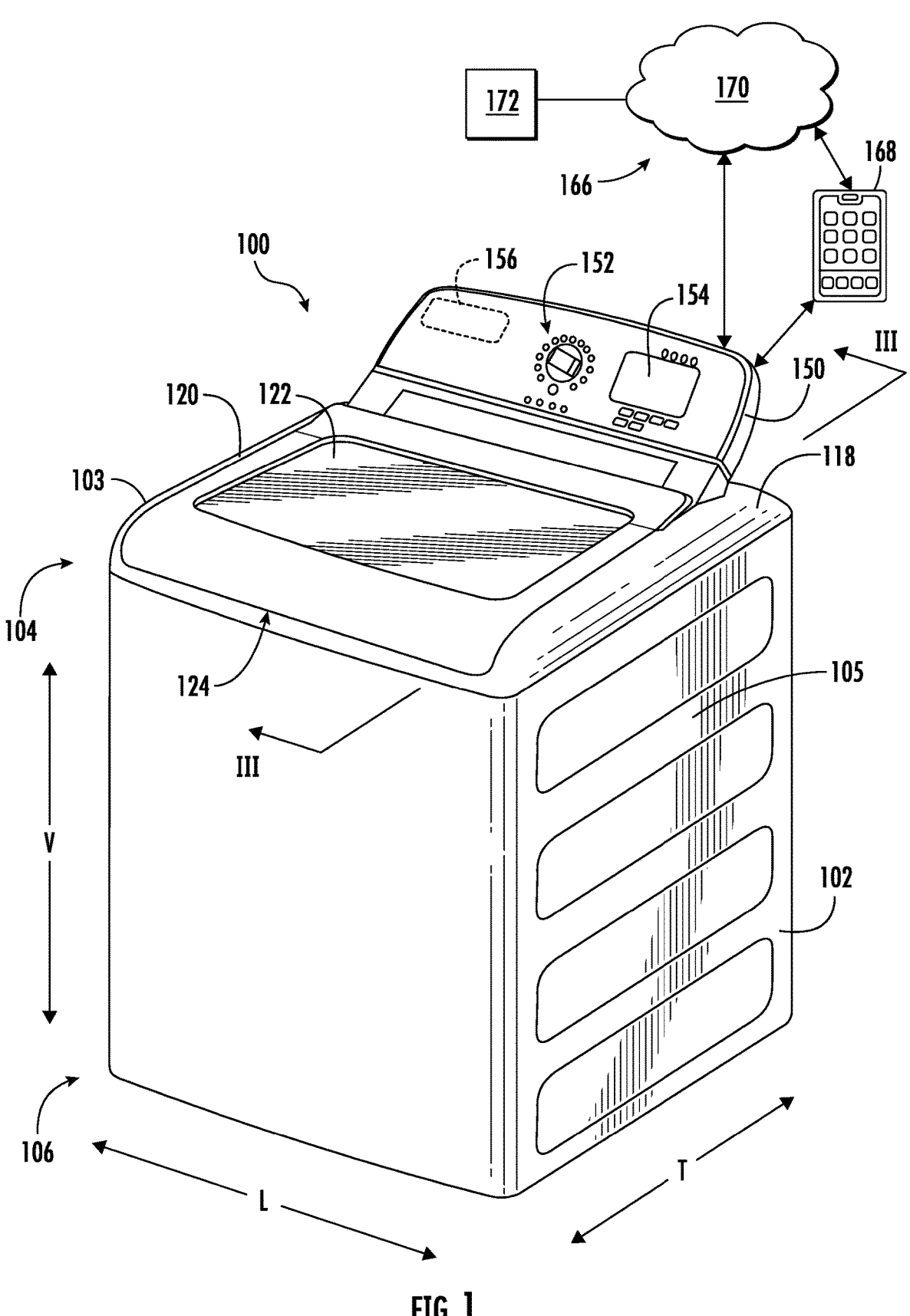
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
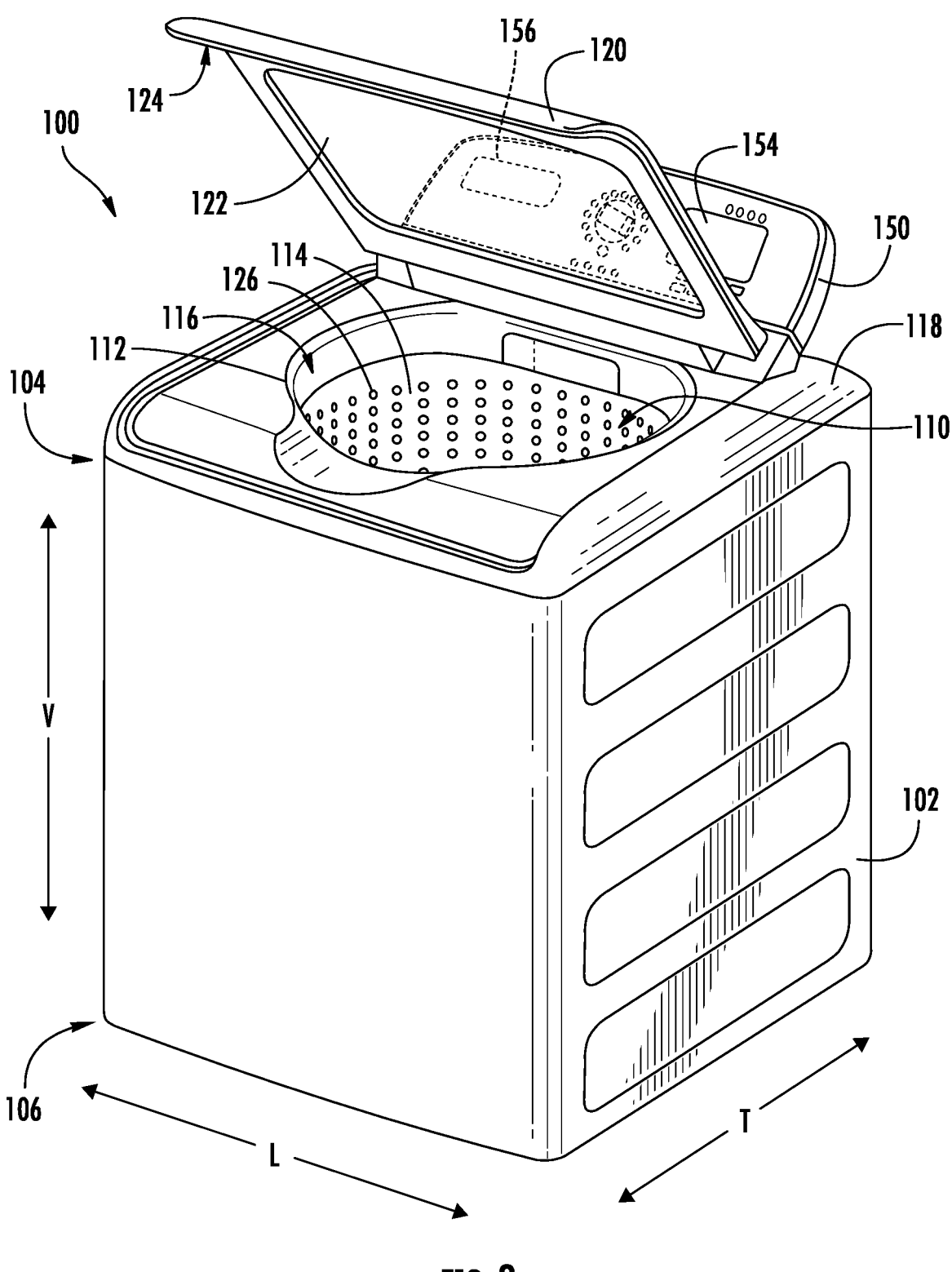
FIG. 2 provides a perspective view of the exemplary washing machine appliance of FIG. 1 with the door of the washing machine appliance shown in an open position.
Figure 3:
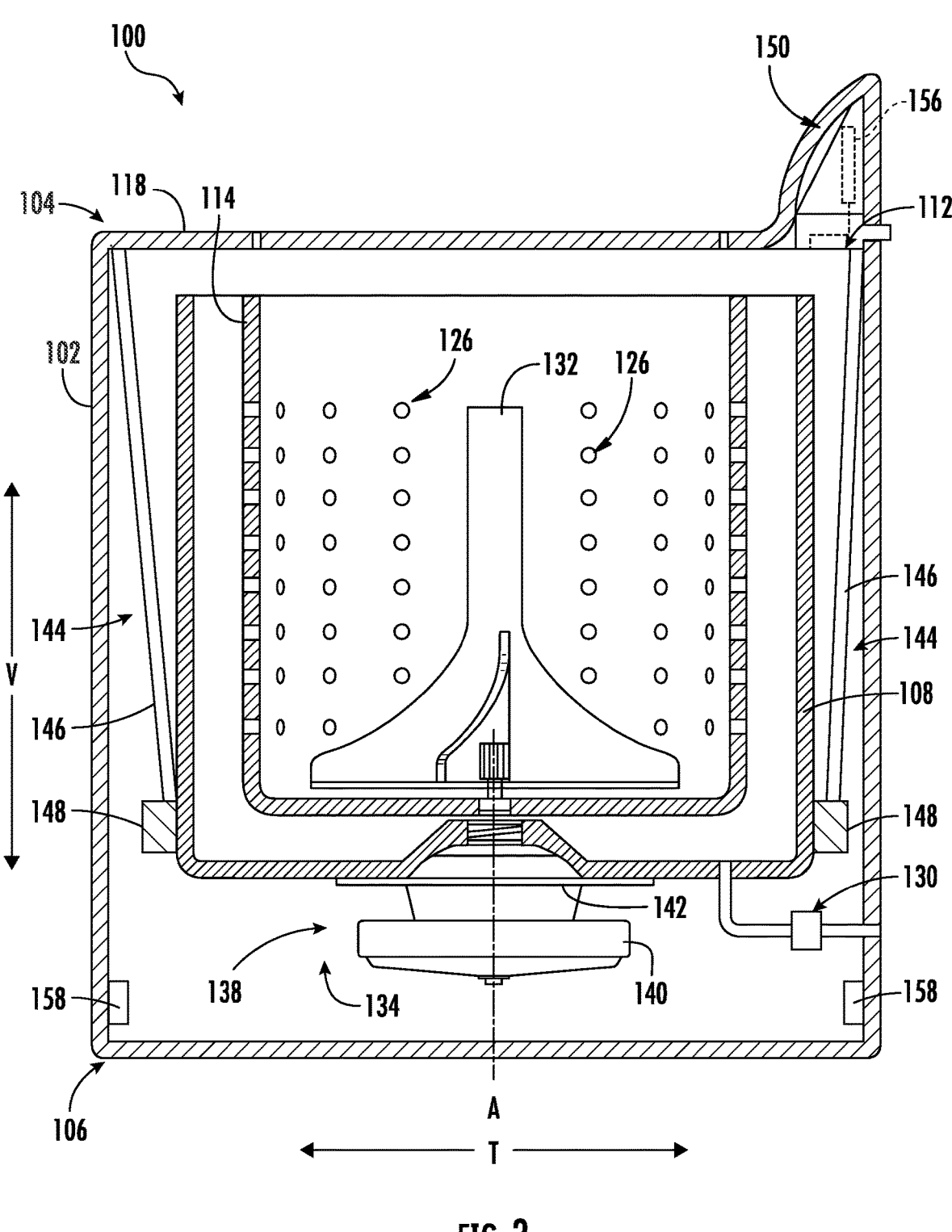
FIG. 3 provides a side cross-sectional view of the exemplary washing machine appliance of FIG. 1 taken along III-III.

Turning to the figures, FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While embodiments of the present disclosure may be described in reference to a vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. As will be generally understood by one of ordinary skill in the art, modifications and variations may be made to vertical axis washing machine appliance 100, including different configurations, different appearances, or different features while remaining within the scope of the present disclosure.

As illustrated in the figures, washing machine appliance 100 comprises a cabinet 102 that extends between a top portion 104 and a bottom portion 106 along the vertical direction V, between a first (left) side panel 103 and a second (right) side panel 105 along the lateral direction L, and between a front panel 107 and a rear panel 109 along the transverse direction T. As best shown in FIG. 3, a wash tub 108 is positioned within cabinet 102, the wash tub 108 defining a wash chamber 110, and generally configured for retaining wash fluids during an operating cycle.

Further, washing machine appliance 100 includes a wash basket 114 positioned within wash tub 108 and generally defining an opening 116 for receipt of laundry articles for washing. Wash basket 114 is supported within wash tub 108 for rotation about an axis of rotation A. According to the illustrated embodiment, the axis of rotation A is substantially parallel to the vertical direction V and runs through the center of the wash tub 108 and wash basket 114. In this regard, washing machine appliance 100 is generally referred to as a "vertical axis" or "top load" washing machine appliance 100. However, it should be appreciated that aspects of the present subject matter may be used within the context of a horizontal axis, or front load, washing machine appliance as well.

As illustrated, cabinet 102 of washing machine appliance 100 has a top panel 118 which defines a top panel opening 112 (FIG. 2) that coincides with opening 116 of wash basket 114 to permit a user access to wash basket 114. Washing machine appliance 100 further includes a lid 120 which is rotatably mounted to top panel 118 to permit selective access to wash basket 114 through opening 116. Lid 120 selectively rotates between the closed position (FIG. 1) and the open position (FIG. 2). In the closed position, lid 120 blocks access to wash basket 114. Conversely, in the open position, a user can access wash basket 114. A window 122 in lid 120 permits viewing of wash basket 114 when lid 120 is in the closed position, for example, during operation of washing machine appliance 100. Lid 120 may also include a handle 124 that may facilitate opening and closing lid 120. Further, although lid 120 is illustrated as mounted to top panel 118, lid 120 may alternatively be mounted to cabinet 102 or any other suitable support.

As illustrated in FIGS. 2 and 3, wash basket 114 further defines a plurality of perforations 126 to facilitate fluid communication between an interior of wash basket 114 and wash tub 108. For at least this purpose, wash basket 114 is spaced apart from wash tub 108 to define a space for wash fluid to escape wash chamber 110. During a spin cycle, wash fluid within articles of clothing and within wash chamber 110 is urged through perforations 126 and may collect in a sump 128 defined between the lower portions of wash basket 114 and wash tub 108. Washing machine appliance 100 may further include a pump assembly 130 (FIG. 3) that is located beneath wash tub 108 and wash basket 114 for gravity assisted flow when draining wash tub 108.

In some embodiments, an impeller or agitation element 132 (FIG. 3), such as a vane agitator, may be disposed in wash basket 114 to impart an oscillatory motion to laundry articles and liquid in wash basket 114. More specifically, agitation element 132 extends into wash basket 114 and assists agitation of articles disposed within wash basket 114 during operation of washing machine appliance 100 to, for example, facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A, which is substantially parallel to vertical direction V and centrally located in wash tub 108.

As best illustrated in FIG. 3, washing machine appliance 100 includes a motor assembly 138 in mechanical communication with wash basket 114 and agitation element 132 (if present) to selectively rotate wash basket 114, for example during an agitation or a rinse cycle of washing machine appliance 100. In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

Motor assembly 138 may generally include one or more of a drive motor 140 and a transmission assembly 142, for example a clutch assembly for engaging and disengaging wash basket 114 and/or agitation element 132 with the drive motor 140. The drive motor 140 may be a brushless DC electric motor, e.g., a pancake motor as illustrated. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Generally, the motor assembly 138 is fixed to the wash tub 108 with appropriate sealing elements (not shown) to achieve a watertight seal to contain wash fluid in the wash tub 108. In many cases, the wash tub 108, the wash basket 114, the agitation element 132, and the motor assembly 138 are collectively referred to as a subwasher assembly. This nomenclature will be used throughout the present disclosure.

The subwasher assembly 134 may be suspended from the cabinet 102 and supported by a vibration dampening suspension system. The dampening suspension system operates to dampen dynamic motion as the wash basket 114 rotates within the tub 108. The dampening suspension system can include one or more suspension assemblies 144 coupled between and to the cabinet 102 and subwasher assembly 134. Generally, the suspension assemblies 144 comprise a suspension rod 146 and a spring damper 148. Typically, four suspension assemblies 144 are utilized, and are spaced apart about the subwasher assembly 134. In the illustrative example of FIG. 3, four suspension assemblies 144 are provided, two are visible in the figure and two are hidden by the visible suspension assemblies 144.

The suspension assemblies 144 may be distributed around the subwasher assembly 134 in any suitable manner to provide support and motion dampening to the subwasher assembly 134. For example, each suspension assembly 144 may be rotatably attached at one end proximate a corner of the cabinet 102. At an opposite end, the suspension assembly 144 may be rotatably attached to the subwasher assembly 134 as illustrated. In other embodiments, the suspension assemblies 144 may be rotatably attached to the cabinet 102 and subwasher assembly 134 in other locations. In the exemplary embodiment of FIG. 3, the spring damper is disposed between the subwasher assembly 134 and the suspension rod 146. In other embodiments, the spring damper 148 may be disposed between the cabinet 102 and the suspension rod 146. In still other embodiments, the spring damper 148 may be disposed in other locations along the length of the suspension rod 146.

Operation of washing machine appliance 100 is controlled by a controller 156 that is operatively coupled (e.g., electrically coupled or connected) to at least one user input selector 152 located on control panel 150 (FIG. 1) for user manipulation to select washing machine cycles and features. Control panel 150 and input selector 152 collectively form a user interface input for operator selection of machine cycles and features. In response to user manipulation of the user input selector 152, controller 156 operates the various components of washing machine appliance 100 to execute selected machine cycles and features. A display 154 on control panel 150 indicates selected features, operation mode, a countdown timer, and/or other items of interest to appliance users regarding operation. In addition to the visual display 154, control panel 150 may also include auditory signaling devices, such as a speaker.

Controller 156 may include a memory (e.g., non-transitory storage media) and microprocessor, such as a general or special purpose microprocessor operable to execute programming instructions or micro-control code associated with a washing operation or cycle. The memory may represent random access memory such as DRAM, or read only memory such as ROM or FLASH. In embodiments, the controller 156 executes programming instructions stored in memory (e.g., as software). The memory may be a separate component from the processor or may be included onboard within the processor. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 (such as the drive motor 140, the transmission assembly 142, and linear position sensors 158—discussed below) may be in operative communication with controller 156 via one or more signal lines or shared communication busses to provide signals to and/or receive signals from the controller 156. For example, the controller 156 may communicate with the motor assembly 138 to selectively rotate the wash basket 114 at various speeds or directions of rotation.

Referring back to FIG. 1, a schematic illustration of an external communication system 166 will be described according to an exemplary embodiment of the present subject matter. In general, external communication system 166 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 166 may be used to transfer data or other information to improve performance of one or more external devices or appliances and/or improve user interaction with such devices.

For example, external communication system 166 permits controller 156 of washing machine appliance 100 to communicate with a separate device external to washing machine appliance 100, referred to generally herein as an external device 168. As described in more detail below, these communications may be facilitated using a wired or wireless connection, such as via a network 170. In general, external device 168 may be any suitable device separate from washing machine appliance 100 that is configured to provide and/or receive communications, information, data, or commands from a user. In this regard, external device 168 may be, for example, a personal phone, a smartphone, a tablet, a laptop or personal computer, a wearable device, a smart home system, or another mobile or remote device.

In addition, a remote server 172 may be in communication with washing machine appliance 100 and/or external device 168 through network 170. In this regard, for example, remote server 172 may be a cloud-based server 172, and is thus located at a distant location, such as in a separate state, country, etc. According to an exemplary embodiment, external device 168 may communicate with a remote server 172 over network 170, such as the Internet, to transmit/receive data or information, provide user inputs, receive user notifications or instructions, interact with or control washing machine appliance 100, etc. In addition, external device 168 and remote server 172 may communicate with washing machine appliance 100 to communicate similar information.

In general, communication between washing machine appliance 100, external device 168, remote server 172, and/or other user devices or appliances may be carried using any type of wired or wireless connection and using any suitable type of communication network, non-limiting examples of which are provided below. For example, external device 168 may be in direct or indirect communication with washing machine appliance 100 through any suitable wired or wireless communication connections or interfaces, such as network 170. For example, network 170 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 166 is described herein according to an exemplary embodiment of the present subject matter. However, it should be appreciated that the exemplary functions and configurations of external communication system 166 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

In embodiments, one or more linear position sensors 158 are provided in the washing machine appliance 100 for determining static position and dynamic positions of the subwasher assembly 134. In some embodiments, three linear position sensors 158 may be used. The one or more linear position sensors 158 are provided to measure movement from the static or neutral position of the subwasher assembly 134 to a dynamic position during one or more dynamic portions of an operative cycle (e.g., a wash cycle, rinse cycle, spin cycle, etc.). As used herein, "static" is intended to mean conditions, measurements, positions, etc. when the wash basket 114 is not rotating.

Conversely, "dynamic" is intended to mean conditions, measurements, positions, etc. when the wash basket 114 is rotating, generally about axis of rotation A (FIG. 3). The static position is determined when the unloaded (i.e., free of laundry articles or wash fluid) subwasher is at rest and suspended within the cabinet 102. In some locations in which the laundry appliance 100 is positioned (i.e., installation locations), the static position will place the subwasher assembly 134 substantially centered, or in a target position, within the cabinet. When centered or in a target position within the cabinet 102, there may be substantially equal, or a predetermined, lateral spacing between the subwasher assembly 134 and the first and second side panels 103, 105 and substantially equal, or a predetermined, transverse spacing between the subwasher assembly 134 and the front and rear panels 107, 109, although lateral and transverse spacing may not be the same.

In other installations, the subwasher assembly may not be centered, or in the target position, in the cabinet in the static position. For example, in conditions where the floor or supporting structure upon which the cabinet rests at the installation location is not flat and level in all directions, the subwasher 134 will come to rest in a static position based on gravity. This may skew the subwasher assembly 134 from the centered or target position within the cabinet 102 such that the subwasher assembly 134, or a portion thereof, is offset towards one or more of the cabinet panels 103, 105, 107, 109. Accordingly, the lateral spacing between the subwasher assembly 134 and the first and second side panels 103, 105 is not equal and the transverse spacing between the subwasher assembly 134 and the front and rear side panels is likewise not equal.

Generally, a linear position sensor 158 is provided to detect a change in the linear distance from a substantially fixed reference point to a target point that is subject to movement. In the present case, distances of interest are from a substantially fixed portion of the cabinet 102, or a component fixed to the cabinet 102, to a portion of the wash tub 108 of the subwasher assembly 134. Accordingly, the reference point is the cabinet, or component thereof, and the target is a portion of the wash tub 108.

Movement of the subwasher assembly 134 may be measured from a selected origin position to a changed position, with that movement detected at the one or more linear position sensors 158. A linear position sensor 158 detects linear movement only, which can be correlated to movement of the wash tub 108 of the subwasher assembly 134. For example, if one or two linear position sensors 158 are used, the extent of linear movement of the subwasher assembly 134 can be confirmed, but the motion of the subwasher assembly 134 cannot be fully defined. At least three linear position sensors 158 may be required to fully define the displacement of the subwasher assembly 134 from the neutral or static position.

Figure 4:
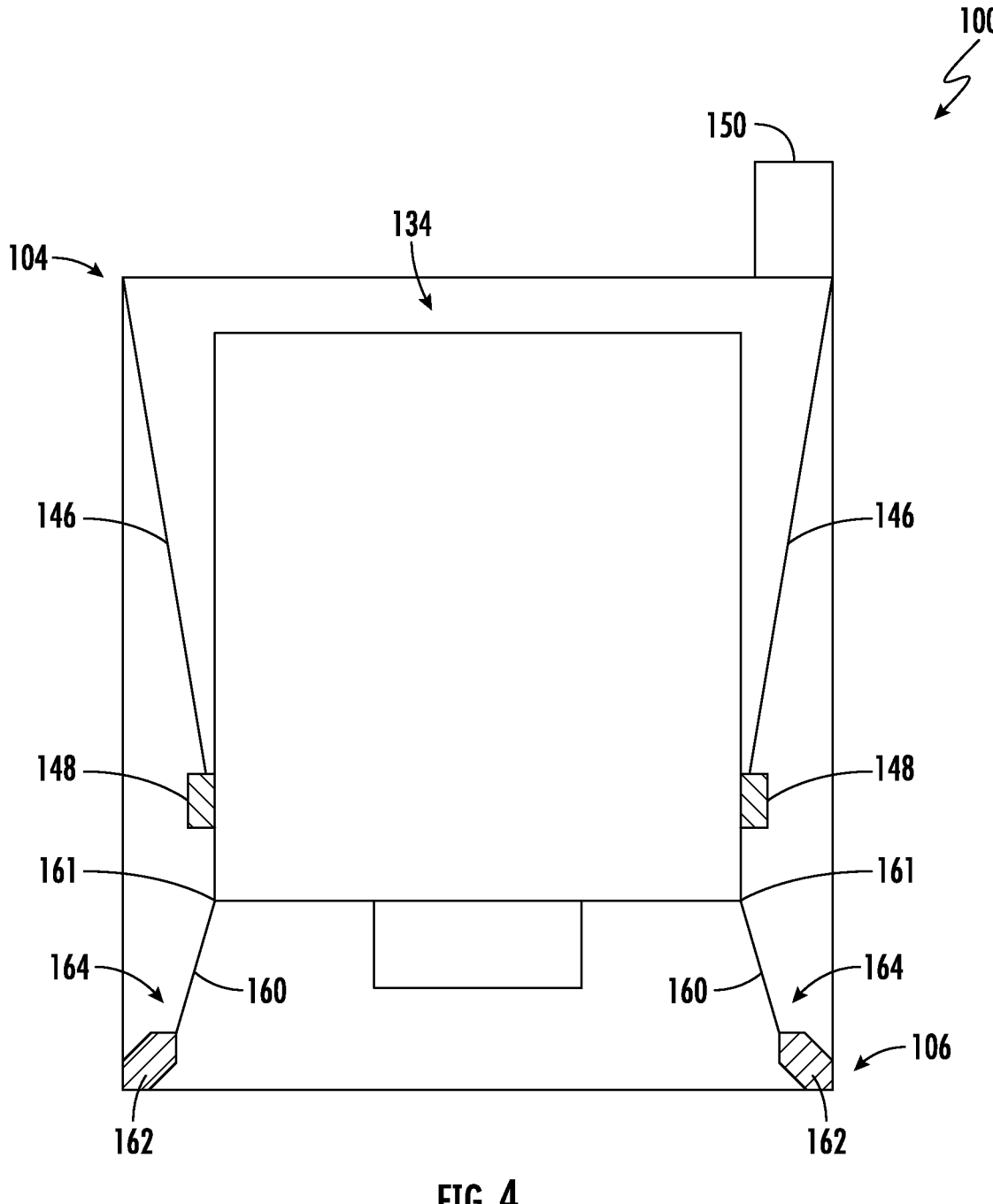
FIG. 4 provides a simplified schematic view of FIG. 3 illustrating a placement of string potentiometers in accordance with an embodiment of the present disclosure.
Figure 5:
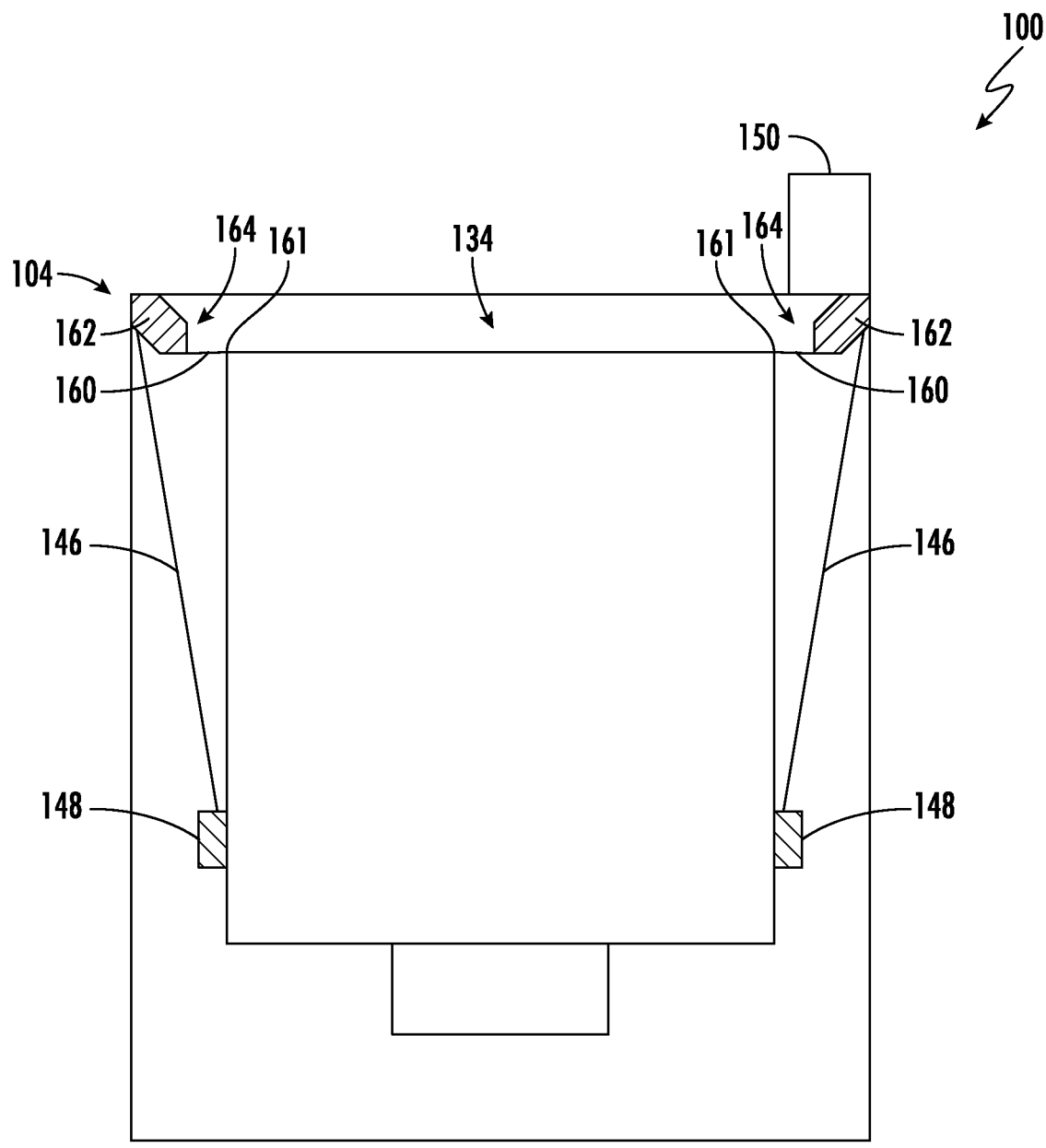
FIG. 5 provides a simplified schematic view of FIG. 3 illustrating a placement of string potentiometers in accordance with an embodiment of the present disclosure.
Figure 6:
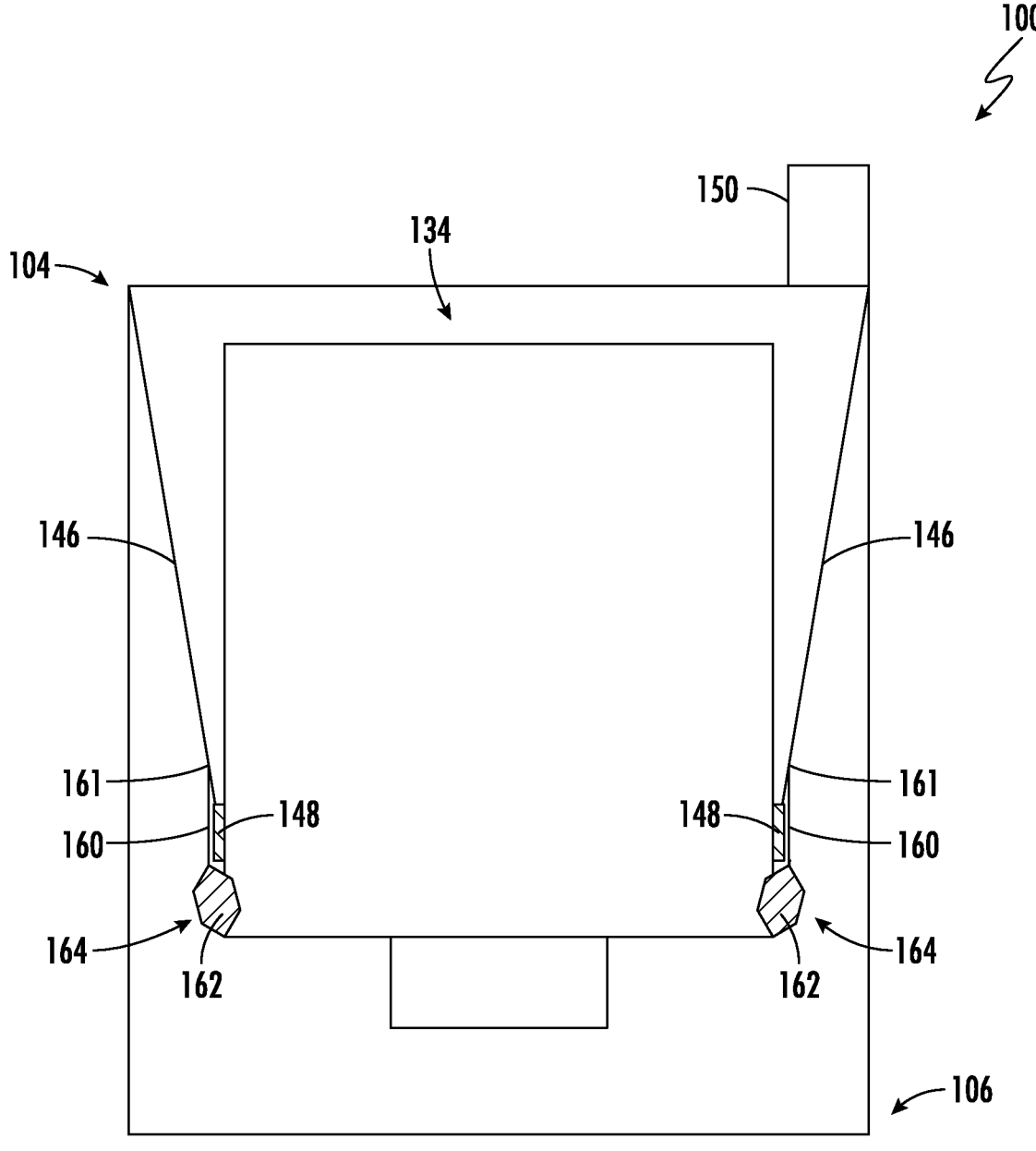
FIG. 6 provides a simplified schematic view of FIG. 3 illustrating a placement of string potentiometers in accordance with an embodiment of the present disclosure.

In embodiments illustrated in FIGS. 4-6, the one or more linear position sensors 158 are string potentiometers 164. As generally understood, a string potentiometer (also known as a draw-wire sensor or a cable extension transducer) comprises a flexible measuring cable or string 160, and a housing 162 comprising a spool of constant diameter, a spring, and a rotational sensor. One end of the string 160 is secured to the spool and a portion of the string 160 is wound around the spool. The free end 161 of the string 160 extends from the housing 160. The string 160 is extensible against a resistive tension force provided by the spring. The resistive tension force also provides retraction of the string 160. As the string 160 extends and retracts, the spool rotates as the string 160 winds onto or from the spool. The rotating spool drives the rotational sensor to create an electrical signal proportional to the linear extension of the string 160. Some rotational sensors may also create a signal proportional to the velocity of the extension and retraction of the string 160.

As illustrated in FIGS. 4-6, the housing 162 of string potentiometer 164 is attached to one of the cabinet 102 and the subwasher assembly 134 and the free end 161 of the string 160, is attached to the other of the cabinet 102 and the subwasher assembly 134. In the embodiment of FIG. 4, the housing 162 is fixed to the cabinet 102 at a bottom 106 of the cabinet 102 and the free end of the string 161 is fixed to a lower corner of the subwasher assembly 134. In the embodiment of FIG. 5, the housing 162 is fixed to a top 104 of the cabinet 102, and the free end of the string 161 is fixed to a portion of the subwasher assembly 134 at the top of the subwasher. In FIG. 6, the housing is fixed to a portion, for example a lower portion, of the subwasher assembly 134 and the free end of the string 161 is fixed to the rigid suspension rod 146.

It should be noted that the arrangements of the string potentiometer 164 illustrated in FIGS. 4-6 are exemplary illustrations and not limitations. One of the housing 162 and the free end of the string 161 of the string potentiometer 164 may be fixed to a portion of the cabinet 102 and the other of the housing 162 and the free end of the string 161 may be fixed to a portion of the subwasher assembly 134. The attachment points on the cabinet 102 and the subwasher assembly 134 may be at any suitable location to allow the operation of string potentiometer 164. Similarly, in FIG. 6, one of the housing 162 and the string free end 161 the string potentiometer 164 is fixed to the subwasher assembly 134 and the other of the housing 162 and the string free end 161 is fixed to the rigid suspension rod 146. In embodiments having more than one string potentiometer 164, some housings may be fixed to the cabinet 102 (or rigid suspension rod 146 in the example of FIG. 6) with the free end of the string 161 fixed to the subwasher assembly 134 and other housings may be fixed to the subwasher assembly 134 with the free end 161 fixed to the cabinet 102 (or rigid suspension rod of FIG. 6). Alternately, all housings 162 may be fixed to the subwasher assembly 134 or all free ends 161 of string 160 may be fixed to the subwasher assembly 134.

When using three string potentiometers 164, movement of the subwasher assembly 134 from the static or neutral position causes the string 160 of at least one string potentiometer 164 to extend and at least one string 160 from another string potentiometer to retract. The one or more string potentiometers 164, specifically the rotational sensor of each string potentiometer 164, is in operational communication with the controller 156 of the laundry appliance 100. The operational communication facilitates the supply of electrical power from the controller 156 to the string potentiometers 164 and communication from the string potentiometers 164 of a signal proportional to the movement of the subwasher assembly 134.

The static position may be determined by the controller 156 from inputs received from the three string potentiometers 164. The static position may be considered an absolute position because the three string potentiometers cooperate to determine the position in the lateral L, transverse T, and vertical V directions within the cabinet 102. As discussed above, the unloaded subwasher assembly 134 at rest (i.e., static) may not be positioned at the center of the cabinet 102 due to, for example, a cabinet support surface that is not properly level and plumb in all directions. The subwasher assembly 134 is then offset towards one or more cabinet panels 103, 105, 107, 109. With reduced spacing between the subwasher assembly 134 and some of the cabinet panels, safe movement (i.e., movement that will not damage the laundry appliance) of the subwasher assembly 134 from the static position may be limited. From the static position communicated by the one or more string potentiometers 164, the controller may be configured to determine level condition and the plumb condition of the cabinet 102. If positioning of the cabinet 102 is not within a predetermined level condition or plumb condition (i.e., a variance), the controller may send an output signal communicating the improper positioning through the display 154 and/or the external device 168.

The controller 156 may also determine the reduced spacing between the subwasher assembly 134 and some of the cabinet panels from the static position. The controller 156 may then determine the maximum displacement for the subwasher assembly 134 from the static position. The controller 156 may provide an out-of-balance alert to a user, for example on the display 154 or on the external device 168, when the maximum displacement is reached, indicating user action is required.

As the subwasher assembly 134 moves from its static or neutral position relative to the cabinet 102, the string 160 extends or retracts. The rotational sensor within each of the string potentiometers 164 generates an electrical signal proportional to the extension or retraction of the associated string potentiometer 164. The electrical signals are processed at the controller 156 to determine the change in position of the subwasher assembly 134 with respect to the cabinet 102. The changed position may be considered to be an absolute position of the subwasher assembly 134. The changed position may be considered absolute because the three string potentiometers cooperate to determine the position in the lateral L, transverse T, and vertical V directions with respect to the cabinet 102. In some embodiments, the electrical signals generated at the string potentiometers 164 include, or may be processed to determine, the acceleration of the subwasher assembly 134 as well.

The movement measured by such linear position sensors 158, particularly string potentiometers 164, can be utilized to monitor the load balance state of the subwasher assembly 134, in particular the wash basket 114 during a laundry operation (e.g., during a spin cycle). An out-of-balance load in the wash basket 114 during a spin operation may result in an eccentric rotation of the wash basket 114 and undesirable movement of the subwasher assembly 134 in the cabinet 102. The controller 156 may use the absolute position and the acceleration of the subwasher 134 during dynamic portions of an operative cycle to determine if an out-of-balance (OOB) condition exists, and if one exists, the severity of the OOB condition. From the absolute position and the acceleration of the subwasher 134, the controller 156 may determine if the OOB condition of the subwasher 134 is likely to cause excessive noise or vibration of the laundry appliance 100 or cause contact with the cabinet 102 or other components of the laundry appliance. For example, the controller 156 may determine the OOB condition will produce noise, vibration, or displacement of the subwasher assembly 134 that fall within a predetermined value or limit. In such a case, the controller 156 will continue the laundry operation.

In another case, the controller may determine that an OOB condition exists that will likely result in one or more of the dynamic position or the change in position of the subwasher assembly 134 exceeding a prescribed value. In response to such an OOB condition of the subwasher assembly 134, the controller 156 may determine the laundry operation should not continue in the current condition. The controller 156 may determine a slower rotational speed of the wash basket 114 is sufficient to reduce the effects of the OOB condition and allow the laundry operation to continue with the speed modification.

In an alternate example, the controller 156 may attempt to rebalance the laundry load in the wash basket 114. To do so, the controller 156 may signal laundry appliance components (for example valves, timers, or flow meters) to introduce water to the wash basket 114 from a water supply and send a signal to the motor assembly 138 to operate in a manner to agitate the laundry load of clothes in the wash basket 134 for a period of time. At the expiration of the period of time, the controller 156 may instruct the motor assembly 138 to rotate the wash basket 134 with the laundry load of clothes, for example in a spin cycle. The agitation and spin cycle may cooperate to redistribute the weight of the laundry load to reduce the OOB condition.

Alternately, the controller 156 may suspend or terminate the laundry operation and send a notification signal indicating that user action is required to rebalance the load in the wash basket 114 and to re-initiate the laundry operation. The notification may be sent to one or more of the display 154 or the external device 168.

Figure 7:
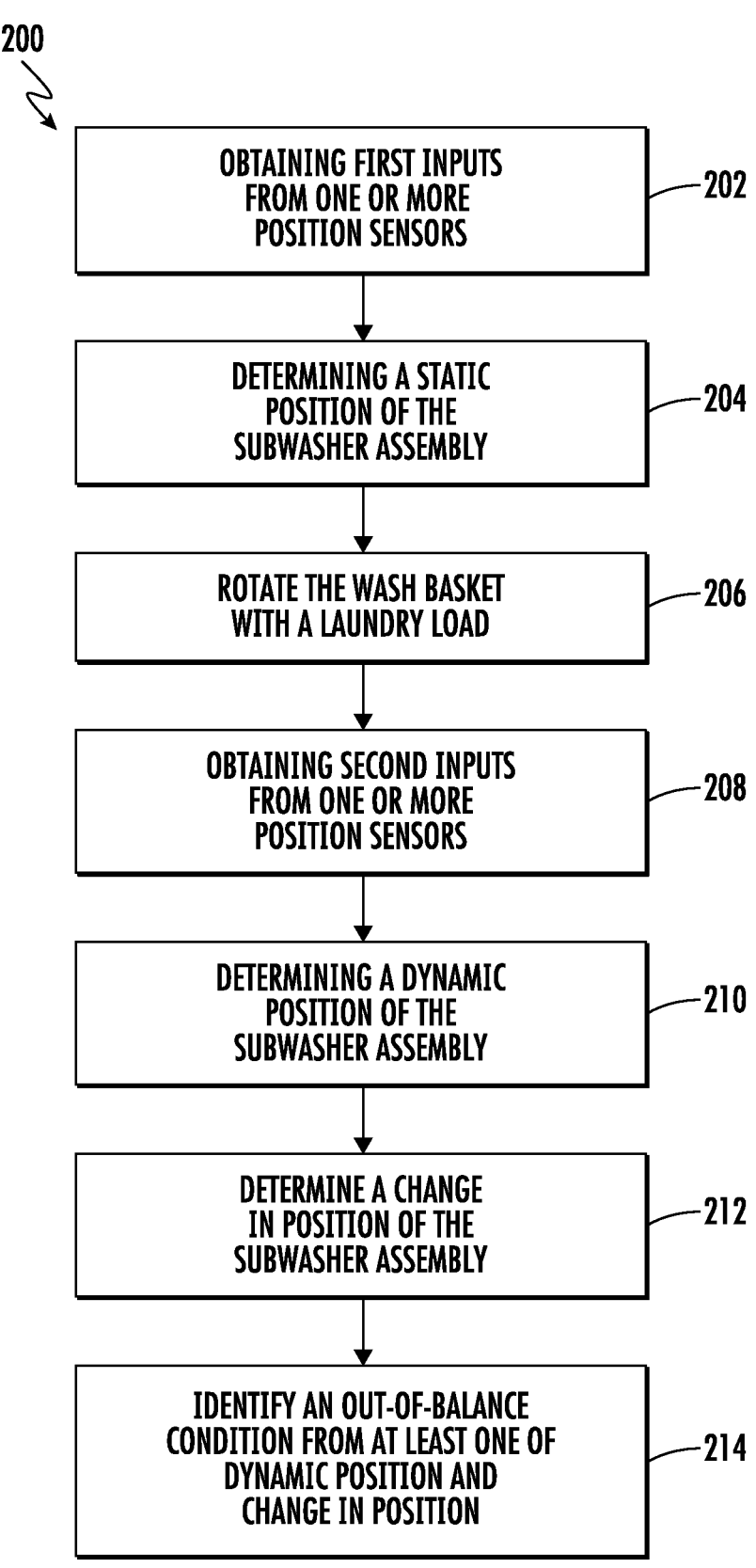
FIG. 7 illustrates a method of operating a laundry appliance in accordance with an embodiment of the present embodiment.

Now that the construction of a laundry appliance in accordance with this disclosure has been presented, an exemplary method 200 of operation for a laundry appliance with one or more position sensors to determine the position of a subwasher assembly will be described with reference to FIG. 7. Method 200 begins at 202 with obtaining a first input from one or more position sensors 158, for example three string potentiometers 164. The string potentiometers operate as discussed above. In some embodiments, three string potentiometers are used.

The first inputs received may correspond to the static position of the subwasher assembly 134 within the cabinet 102. At 204, the controller 156 may determine the static position of the subwasher assembly from the first inputs. The position is static in that the wash basket 114 within the subwasher assembly 134 is not rotating. The static position may be considered an absolute position as the position of the subwasher assembly is known in the lateral, transverse, and vertical directions with respect to the cabinet.

At 206, the wash basket 114 rotates with a laundry load, for example clothes. The motor assembly 138, in operative communication with the controller 156, receives instructions to rotate the wash basket under certain operating conditions, for example rotational direction, speed, and duration. The wash basket rotation may correspond with a spin cycle in a laundry operation. The spin cycle may rotate the wash basket at relatively high speed to urge the flow of water from a laundry load of wet laundry articles. As the wet laundry articles are rotated in the wash basket 114, the laundry articles may be weight unbalanced. As the wash basket rotates, the unbalanced weight may cause eccentric rotation of the wash basket and displacement of the subwasher assembly 134.

At 208, second input signals are obtained from the one or more position sensors, for example string potentiometers. The second signals are obtained as the wash basket is rotating.

At 210 the controller uses the one or more position sensor signals to determine the dynamic position of the subwasher assembly. In some embodiments, three position sensors, for example three string potentiometers, are used to provide an absolute position. The position may be considered dynamic as the wash basket is rotating. The dynamic position is absolute in that the position of the subwasher assembly 134 is known in the lateral, transverse, and vertical directions.

At 212, the controller determines the change in position from the static position to the dynamic position.

At 214, the controller identifies an out-of-balance condition exists with the subwasher assembly based on at least one of the dynamic position and change in position exceeding a prescribed value. When either or both the dynamic position and change in position exceed a prescribed value, the controller has identified, based on preselected criteria, that the displacement of the subwasher assembly is sufficient to risk damage of laundry appliance components. The controller may instruct operation of the laundry appliance in a prescribed manner to address the out-of-balance condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A laundry appliance defining a vertical direction, a lateral direction, and a transverse direction, the vertical, lateral and transverse directions being mutually perpendicular, the laundry appliance comprising:

a subwasher suspended within a cabinet;

one or more suspension elements fixed at a first end to the cabinet and at a second end to the subwasher;

one or more position sensors fixed to the cabinet, the one or more position sensors non-colinear with the one or more suspension elements, wherein the one or more position sensors are string potentiometers; and a controller in operative communication with the one or more sensors, the controller configured to:

receive input from the one or more position sensors; and determine a static position of the subwasher from the input.

2. The laundry appliance of claim 1, wherein the subwasher comprises a tub, a wash basket configured for receiving a load of laundry articles, the wash basket supported for rotation within the tub, and a motor mechanically coupled to the basket.

3. The laundry appliance of claim 2, wherein:

the motor is in operative communication with the controller and receives communications from the controller to selectively rotate the basket; and the controller receives input from the one or more sensors during rotation of the basket to determine a dynamic position of the subwasher.

4. The laundry appliance of claim 3, wherein the controller determines a change in position from the static position to the dynamic position.

5. The laundry appliance of claim 4, wherein the controller identifies an out of balance condition of the subwasher exists when at least one of the dynamic position and the change in position exceeds a prescribed value.

6. The laundry appliance of claim 5, wherein the laundry appliance further comprises a display and the controller sends an output signal indicating an out of balance condition to the display.

7. The laundry appliance of claim 5, wherein the controller sends an output signal to the motor instructing the motor to operate in a manner to agitate a load of laundry articles in the wash basket and selectively rotate the basket after the load of laundry articles is agitated.

8. The laundry appliance of claim 5, wherein the controller:

suspends operation of the motor; and sends an output signal to a display indicating user input is required to rebalance the load of laundry articles and reinitiate operation of the motor.

9. The laundry appliance of claim 1, wherein the string potentiometers comprise:

a housing; and a flexible string having a free end extending outside the housing, the string extendable against a resistive force and retractable under the resistive force; and wherein one of the housing and the free end is fixed to the cabinet and the other of the housing and the free end is fixed to the subwasher such that movement of the subwasher from the static position causes the extension of the string of at least one of the one or more string potentiometers.

10. The laundry appliance of claim 9, comprising three string potentiometers.

11. The laundry appliance of claim 10, wherein the three string potentiometers are arranged such that movement of the subwasher from the static position extends the string of one or more potentiometers and retracts the string of one or more string potentiometers.

12. The laundry appliance of claim 10, wherein the three string potentiometers cooperate to determine an absolute position of the subwasher within the cabinet.

13. The laundry appliance of claim 1, wherein the laundry appliance is one of a vertical axis washing machine and a horizontal axis washing machine.

14. The laundry appliance of claim 1, wherein the controller is further configured to determine a level condition and plumb condition of the cabinet from the static position of the subwasher.

15. The laundry appliance of claim 14, wherein the controller is further configured to send an output signal to a display indicating one or more of the level condition or plumb condition of the cabinet exceed a predetermined variance.

16. A method of operating a washing machine comprising a cabinet, a subwasher comprising a tub, a wash basket configured for receipt of a load of laundry articles and supported for rotation within the tub, and a motor mechanically coupled to the basket, one or more suspension elements positioning the subwasher within the cabinet, and one or more position sensors fixed to the cabinet, the one or more position sensors non-colinear with the one or more suspension elements, wherein the one or more position sensors are string potentiometers, the method comprising:

obtaining a first input from the one or more sensors;

determining a static position of the subwasher from the first input;

rotating the wash basket with the load of laundry articles;

obtaining a second input from the one or more sensors;

determining a dynamic position of the subwasher;

determining a change in position based on the static position and the dynamic position; and identifying an out of balance condition of the subwasher when at least one of the dynamic position and the change in position exceeds a prescribed value.

17. The method of claim 16, further comprising, after identifying the out of balance condition, signaling a user to the out of balance condition.

18. The method of claim 16, wherein three string potentiometers are used to determine an absolute position of the subwasher in the cabinet.

19. The laundry appliance of claim 1, wherein the cabinet comprises a bottom portion, wherein the one or more position sensors are fixed to the bottom portion of the cabinet.

20. The method of claim 16, wherein the cabinet comprises a bottom portion, wherein the one or more position sensors are fixed to the bottom portion of the cabinet, the method comprising obtaining a first input from the one or more sensors at the bottom of the cabinet.

* * * * *